United States Patent
Causey

(10) Patent No.: US 6,687,500 B1
(45) Date of Patent: Feb. 3, 2004

(54) SYSTEM FOR TESTING SOFT HANDOFF FUNCTIONALITY OF A MOBILE STATION USED FOR A CODE DIVISION MULTIPLE ACCESS (CDMA) MOBILE COMMUNICATION SYSTEM

(76) Inventor: Dave Causey, 1180 Breezewood Dr., Lewisville, TX (US) 75077

(*) Notice: Subject to any disclaimer, the term of this patent is extended or adjusted under 35 U.S.C. 154(b) by 393 days.

(21) Appl. No.: 09/667,125

(22) Filed: Sep. 21, 2000

Related U.S. Application Data

(60) Provisional application No. 60/155,284, filed on Sep. 21, 1999.

(51) Int. Cl.[7] .................................................. H04Q 7/20
(52) U.S. Cl. ........................ 455/423; 455/436; 455/442; 455/67.11
(58) Field of Search ............................... 455/436, 442, 455/550, 552, 180.1, 188.1, 67.1, 67.3, 67.4, 67.5, 423; 375/347, 140; 370/311, 241, 247, 251

(56) References Cited

U.S. PATENT DOCUMENTS 6,052,584 A * 4/2000 Harvey et al.
6,073,021 A * 6/2000 Kumar et al.
6,438,357 B1 * 8/2002 Oh et al.

* cited by examiner

Primary Examiner—Sinh Tran
Assistant Examiner—Huy Nguyen
(74) Attorney, Agent, or Firm—Fliesler Dubb Meyer & Lovejoy LLP

(57) ABSTRACT

A base station simulator (400) provides testing of soft handoff functionality for a mobile station (400), such as a mobile telephone, between a first base station (BS1) and a second base station (BS2). The base station simulator (400) includes two digital baseband processors (402) and (404) for generating forward transmission signals to simulate the signals from the two base stations (BS1) and (BS2). The two digital base station signals have gain digitally controlled using multipliers (407–409) and the signals are added together digitally using a digital adder (410) before conversion to an analog signal using an A/D converter (412). The base station simulator (400) avoids the additional cost and space required for the redundant parts from two separate base station simulators, as conventionally used for testing soft handoff functionality. Adding of the digital signals before converting to analog in A/D converter (412) increases measurement accuracy, and control of the combined baseband processors (402) and (404) as opposed to separate controllers for separate base station simulators simplifies operation from conventional systems for testing soft handoff.

12 Claims, 4 Drawing Sheets

SYSTEM FOR TESTING SOFT HANDOFF FUNCTIONALITY OF A MOBILE STATION USED FOR A CODE DIVISION MULTIPLE ACCESS (CDMA) MOBILE COMMUNICATION SYSTEM

CROSS-REFERENCE TO PROVISIONAL APPLICATION

This Patent Application claims the benefit of Provisional Application No. 60/155,284 filed Sep. 21, 1999.

BACKGROUND OF THE INVENTION

1. Field of the Invention

The present invention relates to an apparatus for testing the soft handoff functionality of a mobile station, such as cellular telephone acting as the mobile station being handed off between two base stations. More particularly, the present invention relates to an apparatus for testing soft handoff functionality of a Code Division Multi-Access (CDMA) communication system.

2. Description of the Related Art

An explanation of soft handoff and a description of a conventional apparatus to test soft handoff are provided below.

A. Soft Handoff

Soft handoff is a handoff between CDMA channels that have identical frequency assignments. Soft handoff provides diversity of Forward Traffic Channel and Reverse Traffic Channel paths on the boundaries between base stations. A traffic channel is defined as a communication path between a mobile station and a base station used by both a user and signaling traffic, the signaling traffic controlling communication between the mobile station and base station. The term "traffic" implies a forward traffic channel (base station to a mobile station) and a reverse traffic channel (mobile station to base station) functioning as a pair.

Before and during soft handoff, a base station and its neighboring base stations send pilot channel signals on a carrier and a MS (Mobile Station) monitors the signal strength of the pilot channels. The pilot channel is an unmodulated direct-sequence spread spectrum signal transmitted continuously to each CDMA base station. A pilot channel allows a MS to acquire the timing of a forward CDMA channel, provide a phase reference for coherent demodulation, and provide a means for signal strength comparisons between base stations for determining when to handoff. The MS measures the pilot strengths and provides a signal back to the base stations reporting the pilot signal strengths.

FIG. 1A illustrates soft handoff between two base stations. FIG. 1A shows a MS moving away from a Base Station (BS1) and approaching a Base Station 2 (BS2), while the MS is receiving a traffic channel from BS1 on the boundary between BS1 and BS2. When the MS detects a pilot signal from BS2 of sufficient strength, the MS reports the pilot strength to BS1. Then BS1 sends the MS a message telling the MS to receive the traffic channel of BS1 and the traffic channel of BS2. The MS then begins to receive both BS1 and BS2 traffic channels simultaneously (providing a diversity of forward link). At this point, both BS1 and BS2 are receiving traffic channels from the MS, which allows the transmission of higher quality traffic data to the network (providing diversity of reverse link). As the MS moves farther away from BS1, the MS will detect a weak pilot strength and report the weak pilot strength from BS1. The MS then begins to receive only the traffic channel from BS2. During the entire process, the MS can make handoffs between BS1 and BS2 without interrupting communication.

FIG. 1B illustrates sector-to-sector handoff for a single base station 100 transmitting over different antennas to separate sectors using different sector units 102 and 104 of the single base station 100. Such sector-to-sector handoff is sometimes referred to as softer handoff. FIG. 1B shows the two sectors 102 and 104 located in the single base station 100 for covering adjacent sectors. Softer handoff occurs when the MS is moving on the boundary between a sector 1 controlled by a sector unit 102 and a sector 2 controlled by sector unit 104.

B. Conventional System To Test Soft Handoff Functionality

Soft handoff is a procedure enabling an interruption-free handoff. Manufacturers of CDMA phones assure communication quality by verifying the soft handoff functionality. The following are requirement specifications for a conventional test apparatus for testing soft handoff functionality of a MS:

- Be able to simulate two base stations.
- Be able to add Additive White Gaussian Noise (AWGN) to the forward link signal.
- Be able to control the level of the forward link signal (including the forward link signal of BS1, the forward link signal of BS2 and (AWGN) correctly and with sufficient resolution.
- Be able to exchange messages needed during handoff with the MS.
- Be able to display the contents of the pilot strength measurement report sent from the MS.
- Be able to define the contents of the system parameter message from the base station (some parameters are used to inform the MS of a condition to monitor pilot strength).

FIG. 2 shows one example of a conventional test system for testing soft handoff. The test system includes two base station simulators (BS1) 202 and (BS2) 204, an AWGN generator 206, a test system controller 200, couplers 207, 208, a duplexer 210 and a power divider 212. Generally the test system shown in FIG. 2 and a (MS) 214 are connected using RF cables. An antenna or aerial interface may be used between the duplexer 210 and MS 214 instead of the RF cables depending on the condition of the test.

1. Base Station Simulators 202, 204

Two base station simulators 202 and 204 are needed to simulate two base stations. The MS 214 will make a handoff from one base station simulator to another during testing. FIG. 3 shows a block diagram of a conventional base station simulator as described in more detail below.

2. AWGN Generator 206

The AWGN generator 206 is used to simulate noise and signals sent from other base stations in the field. Some base station simulators have a built-in AWGN generator. The base station simulators in a conventional test system can have built in AWGN generators, so a separate AWGN generator as shown in FIG. 2 is not needed.

3. Test System Controller 200

In order to execute soft handoff between one base station simulator to the other, the two base stations 202 and 204 need to synchronize with each other. The test system controller 200 is used to control both base station simulators, allowing them to handle call processing or message transmission/receptions to and from the MS 214 being tested. The test system controller 200 also controls the AWGN. The test system controller 200 controls the forward link signal for both of the base station simulators 202 and 204 and the AWGN 206. The test system controller 200 further provides for displaying of the contents of the pilot strength measurement report message sent from the MS 214.

4. Couplers 207, 208 & Duplexer 214

The couplers 207 and 208 are used to combine the forward link signals of the base station simulators, and the AWGN and provides those signals to a duplexer 210. The duplexer directs the signal from the coupler 208 through either a cable or antenna to a mobile station 214.

5. Power Divider 212

The reverse link signal from the MS 214 is directed by the duplexer which then feeds the signal received to both base station simulators using the power divider 212.

6. Conventional Base Station Simulator Circuitry (FIG. 3)

FIG. 3 shows the components of a conventional base station simulator, such as either 202 or 204. The conventional components of the base station simulator includes a transmit (TX) baseband processor 302 which generates a digital forward link signal with a desired indication for amplitude. The digital forward link signal is converted to an analog signal in a digital to analog (D/A) converter 304. The output of the D/A converter 304 is then provided through a quadurature modulator 306 and upconverter 308 for transmission from the base station simulator. A signal received by the base station simulator shown in FIG. 3 is downconverted in downconverter 310, demodulated in quadrature demodulator 312 and converted from an analog to a digital signal in the A/D converter 314. The output of the A/D converter is provided to a receive (RX) baseband processor 316 which functions to further demodulate the received IF digital, decode the demodulated data and provide the demodulated data to the control part 320. The output of the A/D converter further provides its output to a MS performance measurement unit 318 which measures the accuracy of the signal level and determines modulation accuracy of a MS. The control part 320 controls the call processing status and hardware settings that simulate a base station according to the condition that a test operator sets via the user interface 322. The user interface 322 can include a display screen and keypad, or a remote controlling computer.

C. Drawbacks of Conventional System

The conventional system for testing the soft handoff function of a MS has the following drawbacks:

The test system needs two base station simulators and an external controller (including hardware and software). The cost of a conventional test system is, thus, more than double the cost of one base station simulator.

The individual forward link signal levels of BS1 202, BS2 204 and AWGN 206 are specified relative to the total forward link signal power, i.e. BS1+BS2+AWGN. Maintaining accurate forward link signal levels is then critical to testing the soft handoff functionality of the MS 214, and maintaining the accuracy is very difficult since it typically requires rigorous calibration for each signal source.

The test system operator needs to operate the two base station simulators 202 and 204 and a test system controller 200. The different connections for these components during a test procedure, and steps for operating each of the components during the test means an operator must perform a number of complicated tasks. A test system controller might be configured which could automatically make the connections and automatically preform the steps required for testing to minimize the operator tasks, but the cost for development of such a system could be high.

SUMMARY OF THE INVENTION

In accordance with the present invention, a system is provided for testing soft handoff functionality which avoids the cost and space required for the redundant components of two separate base station simulators. The system in accordance with the present invention further provides improved accuracy in generating signal strength levels for the forward link signals. The system further provides a reduction in complexity for the test procedure relative to a conventional system for testing soft handoff functionality. The system further provides testing for soft handoff between two base stations as illustrated in FIG. 1A, or softer handoff between two sectors of a single base station as shown in FIG. 1B.

Referring to FIG. 4, the base station simulator 400 in accordance with the present invention includes two digital baseband processors 402 and 404 for generating forward transmission signals to simulate the signals from the two base stations (BS1) and (BS2). The two digital base station signals have gain digitally controlled using multipliers 407–409 and the signals are added together digitally using a digital adder 410 before conversion to an analog signal using an A/D converter 412. Adding of the digital signals before converting to analog in A/D converter 412 increases measurement accuracy, as opposed to coupling the base station analog signals together. Further, adding of a digital noise signal from an AWGN generator 406 before conversion to analog can further improve accuracy.

The system further includes components for upconverting the signal from the D/A converter 412 and transmitting the upconverted signal to a mobile station 430. Additionally, the system includes components for downconverting the signal transmitted from the mobile station 430 and measuring the performance of the MS 430, similar to the components of a single base station simulator shown in FIG. 3. But, by combining the signals from two baseband processors 402 and 404 before upconversion using a single upconversion system, and by using a single system for downconversion, the additional cost and space required for the redundant parts from two separate base station simulators is avoided. Further, control of the combined baseband processors 402 and 404, as opposed to separate controls for separate base station simulators, simplifies operation of the system in accordance with the present invention.

BRIEF DESCRIPTION OF THE DRAWINGS

Further details of the present invention are explained with the help of the attached drawings in which.

DETAILED DESCRIPTION

Figure 4:
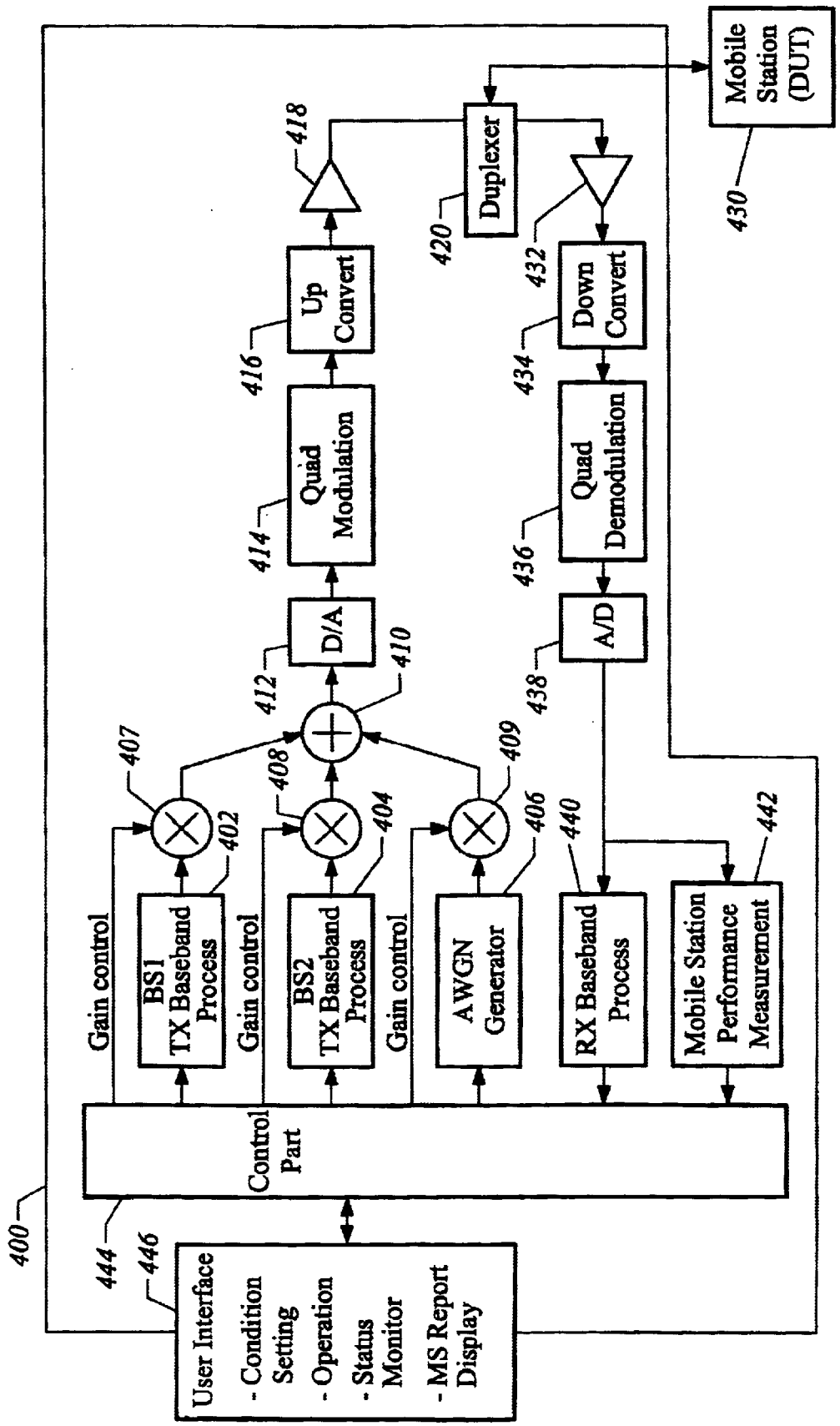
FIG. 4 shows components of a base station simulator in accordance with the present invention.

FIG. 4 shows a block diagram of components used to test soft handoff in accordance with the present invention. A central aspect of the apparatus of FIG. 4 is that it contains two independent baseband processors 402 and 404 within one base station housing 400 to simulate the individual forward link signals of two base station simulators. The two base station processors 402 and 404 allow one base station simulator 400 to generate the forward link signals of two base stations (BS1 and BS2) by itself.

In the system of FIG. 4, signals from two base station processors 402 and 404 and an AWGN noise generator 406, also included in the simulator housing 400, are summed digitally in baseband using a digital adder 410 prior to conversion to an analog signal using a single D/A converter 412. The D/A converter 412 signal is provided through quadrature modulator 414 and upconverted to an RF frequency using upconverter 416. The upconverted signal is finally provided through an amplifier 418 and duplexer 420 for provision to a mobile station (MS) or device under test (DUT) 430. The use of digital technology allows for accurate signal level settings for BS1 and BS2 and AWGN because their gains are set through simple digital multiplication. Summation of the Forward Link signals in baseband virtually eliminates the effects that typical gain variations associated with the use of independent signal sources have on the relative power levels for BS1, BS2, or AWGN with the total forward link power (BS1+BS2+AWGN).

Figure 2:
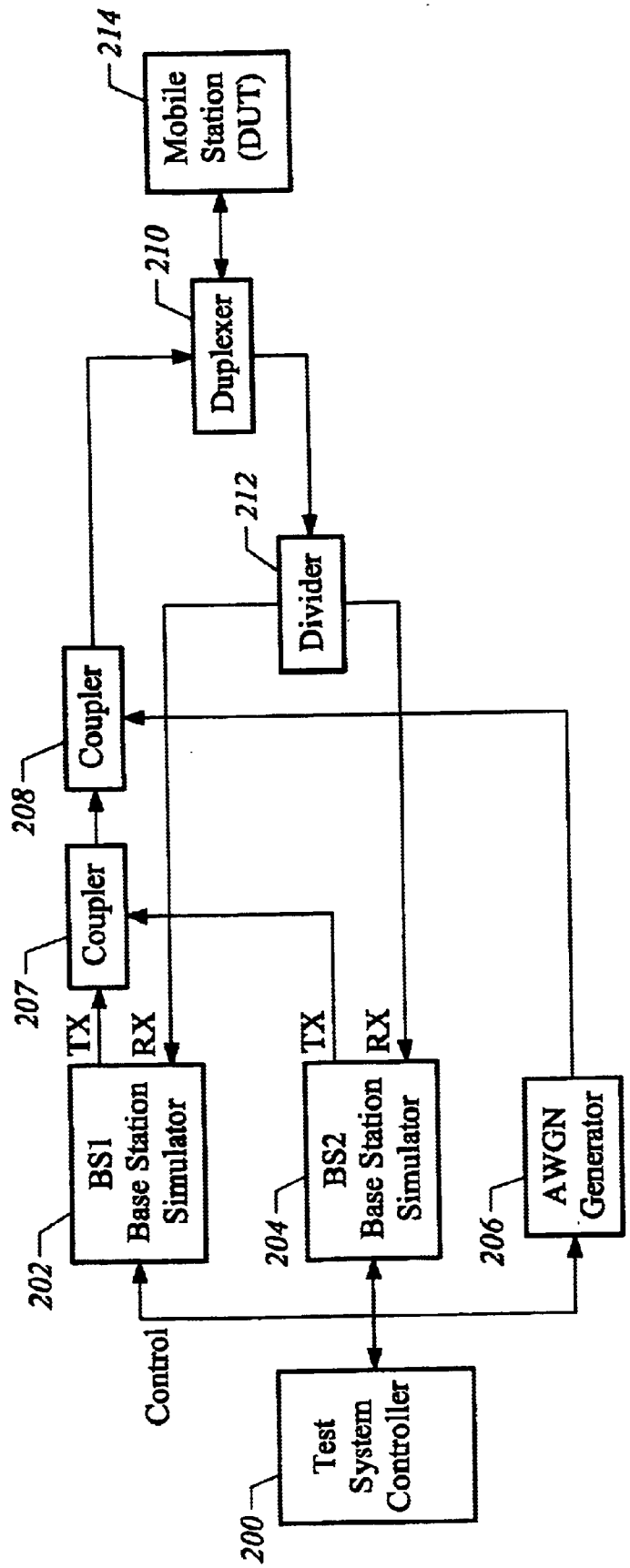
FIG. 2 shows components of a conventional test system for testing soft handoff.
Figure 3:
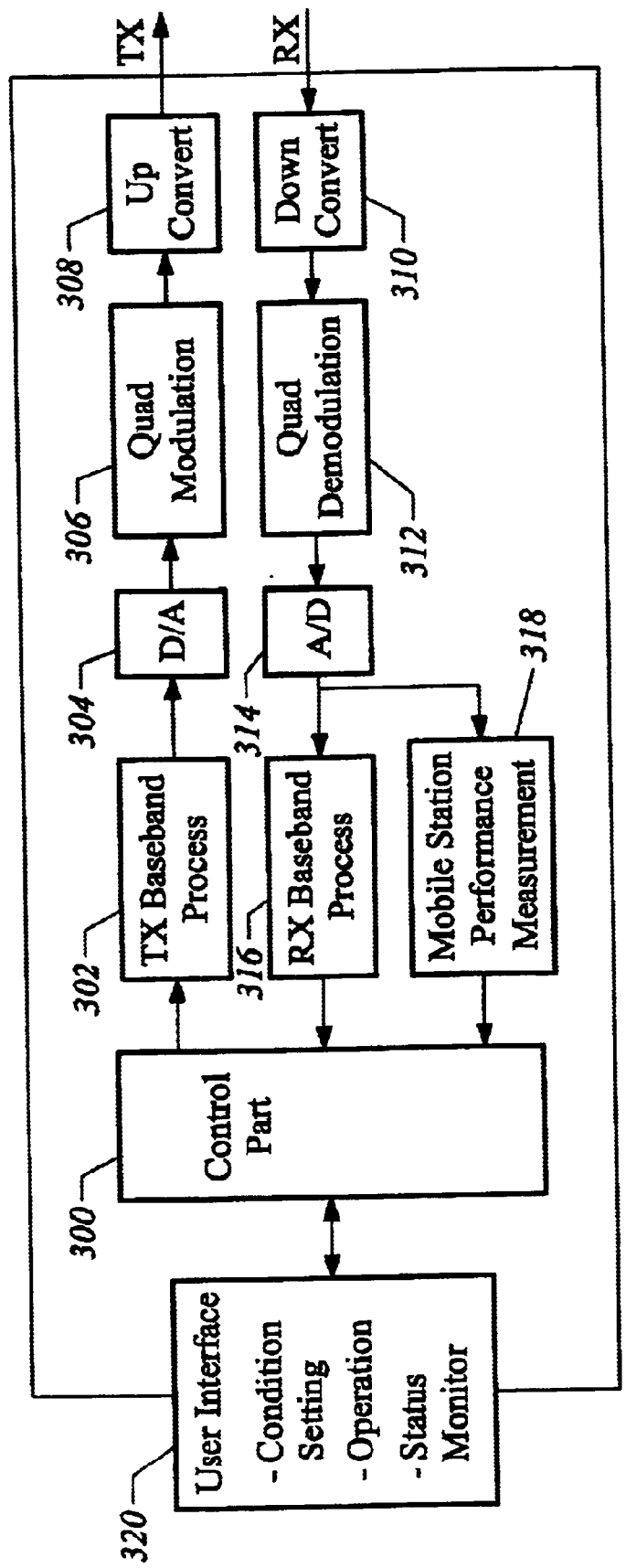
FIG. 3 shows components of a conventional base station simulator.

Since the system shown in FIG. 4 requires only one base station simulator 400, it provides an inexpensive and attractive solution for testing soft handoff compared with a conventional system which requires two base station simulators, such as 202 and 204 of FIG. 2. For transmission to the MS 430, the system of FIG. 4, thus, does not require an additional D/A converter 412, quadrature modulator 414 or upconverter 416, as would be required when two separate systems with components shown in FIG. 3 are used.

To process signals received from the MS 430, the duplexer 420 of FIG. 4 directs signals received from the MS 430 through an amplifier 432, and through a single downconverter 434 and quadrature demodulator 436 to an A/D converter 438. The A/D converter 438 provides its output to a receive (RX) baseband processor 440 which functions to further demodulate the received IF digital, decode the demodulated data and provide the demodulated data to the control part 444. The output of the A/D converter 438 further provides its output to a MS performance measurement unit 442 which measures the accuracy of the signal level and determines modulation accuracy of the MS 430. The control part 444 controls the call processing status and hardware settings that simulate a base station according to the condition that a test operator sets via the user interface 446. As with the transmitting portion of the base station simulator 400, the receiving portion only requires one set of receiving components 432, 434, 436, 438, 440, 442, 444 and 446 as opposed to two sets of the components 310, 312, 314, 316, 318, 300 and 320 shown in FIG. 3.

A. Base Station Simulator Details

Further information relating to the components of the base station simulator 400 shown in FIG. 4 is provided in the sections to follow.

1. BS1 TX Baseband Processor 402

The BS1 TX Baseband Processor 402 does coding and modulation to generate a baseband signal that simulates the forward link signal of a first base station-BS1.

2. BS2 TX Baseband Processor 404

The BS2 TX Baseband Processor 404 does coding and modulation to generate a baseband signal that simulates the forward link signal of a second base station-BS2.

3. AWGN Generator 406

The AWGN generator 406 generates additive white Gaussian noise to simulate noise in the forward link signal going to a MS 430 being tested.

4. Gain Controller Multipliers 407–409 And Adder 410

Digital gain controller multipliers 407–409 are used to set the signal gain of the forward link signals from the base stations 402 and 404 and the AWGN generator 406 in baseband. The gain control is set by multiplying the signal is set by multiplying the signal from the base stations 402 and 404 and the signal from the AWGN generator 406 by signals provided from the control part 404 in the respective gain control multipliers 407 and 409 signal according to conditions set by a user using the user interface 446 to set the control part. The BS1, BS2 and AWGN signals are added by an adder 410 after gain control.

5. D/A Converter 412, Quad Modulator 414, Up Converter 416 And Amplifier 418

The D/A converter 412 converts the digital baseband signal to an analog signal. A carrier signal is modulated by the analog baseband signal from the D/A converter in the quadrature modulator 414. The up converter 416 converts the modulated carrier to an RF signal, and the amplifier 418 sets the carrier signal level to a proper level for testing and applies the signal to the MS 430 through duplexer 418.

6. Amplifier 432, Down Converter 434, Quad Demodulator 436 And A/D Converter 438, RX Baseband Processor 440, MS Performance Measurement Unit 442 And Control Part 444

The amplifier/attenuator 432 receiving a signal from the MS 430 through the duplexer 418 adjusts the received signal to a proper level that the test system can process. The down converter 434 converts the carrier frequency to an intermediate frequency (IF). The IF is then demodulated using the quadrature demodulator 436. The A/D converter 438 the converts the analog demodulated signal to a digital signal. The RX baseband processor 440 further demodulates the received IF signal and decodes the demodulated data. The MS performance measurement unit 442 measures the performance, including signal level or modulation accuracy of the signal transmitted from the MS 430 during the soft handoff test. The control part 444 controls the call processing status and hardware settings that simulate a base station according to the condition that a test operator sets via the user interface 446.

7. User Interface 446

The test system operator can set the conditions for test and perform the call processing and soft handoff test via the user interface 446. The user interface 446 can include a display screen and keypad, or a remote controlling computer. The major purposes of the user interface 446 are:

- Setting parameters to define call processing and signal condition, i.e. frequency, signal level, etc.
- Ability to change the call processing state, call process parameters, or signal level, etc.
- The ability to display the call processing status, the soft handoff test status, the contents of the mobile station messages, or measurement results of the mobile station's transmission signal performance.

B. Test Procedure

A steps of a test procedure using the test system of FIG. 4 to test a MS 430 is provided below. In the procedure steps, the test system 400 is referred to as a Base Station Simulator (BSS) and MS being tested 430 is referred to as the MS. The steps are as follows:

(1) The operator connects the BSS and MS.
(2) The operator sets the condition for call processing and soft handoff on the BSS and begins testing.
(3) The BSS begins transmitting configuration and access information (for BS1) to the MS. The channels used for configuration and access information include the pilot, synchronization and paging channels.
(4) The operator turns on the MS.
(5) The MS receives the configuration and access information and executes the Registration process with the BSS.
(6) The BSS establishes a call with the MS. The BSS and the MS change to the "conversation" state.
(7) The BSS generates a forward link signal from the secondary base station (BS2).
(8) The operator changes the levels of BS1, BS2 or AWGN and checks the contents of messages then sent from the MS that report the receiving level at the MS. The operator then verifies whether the MS is measuring the signal levels correctly.
(9) The operator then orders the BSS to send a message to the MS to enter soft handoff, combining the signals from BS1 and BS2 and repeats step (8).

C. System Advantages

The system in accordance with the present invention offers the following advantages over a conventional system:
1. Cost And Space Savings A conventional system needs two base station simulators, an external controller, a coupler and a power divider to test the soft handoff functionality of a mobile station as illustrated in FIGS. 2 and 3. The system in accordance with the present invention as shown in FIG. 4 only needs additional baseband process circuitry in a conventional base station simulator and will not require a large number of other duplicated components. The cost for the apparatus in accordance with the present invention is then roughly half of a conventional test apparatus.

2. Operation Simplification

The operator needs to control and set conditions for two base station simulators 202 and 204 and a separate controller 200 when performing tests using a conventional test apparatus. The test steps the operator performs are time consuming and difficult. Although it may be possible to program the controller 200 to perform a majority of the operator steps, it may require lengthy and costly development of the software as well as the hardware to interface between the controller 200, base stations 202 and 204 and MS 214 for all the test conditions. When an operator tests the soft handoff functionality with the system as shown in FIG. 4 in accordance with the present invention, the operator can connect the MS being tested 430 and test system directly without changing the test system hardware configuration during testing and without manually controlling two separate base station simulators. Testing is, thus, simpler and less time consuming.

3. High Accuracy Of Relative Level Between BS1, BS2, AWGN And Total Level

As indicated previously, the baseband processing of the signal levels from the baseband processors 404 and 404 and AWGN generator 406 is performed with the test system of FIG. 4 in accordance with the present invention using digital technology (including digital signal processing and/or digital circuits) allowing the relative signal levels to be set very accurately. The summation of the digital signals in baseband using a digital adder or summer 410 eliminates the effect that RF amplifier variations have on the overall relative signal level accuracy and eliminates the need for rigorous calibration that individual signal sources of a conventional test apparatus require.

D. Conclusion

Figure 1A:
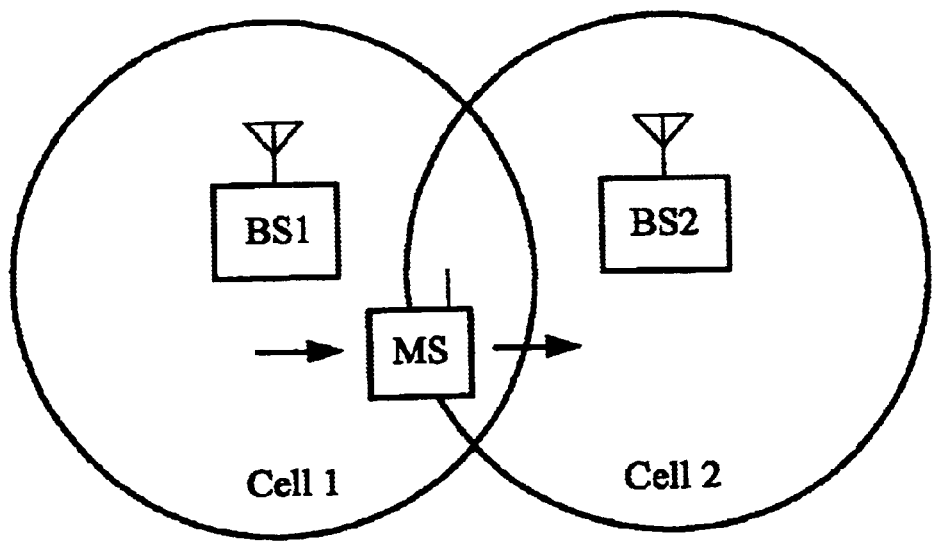
FIG. 1A illustrates soft handoff between two base stations.
Figure 1B:
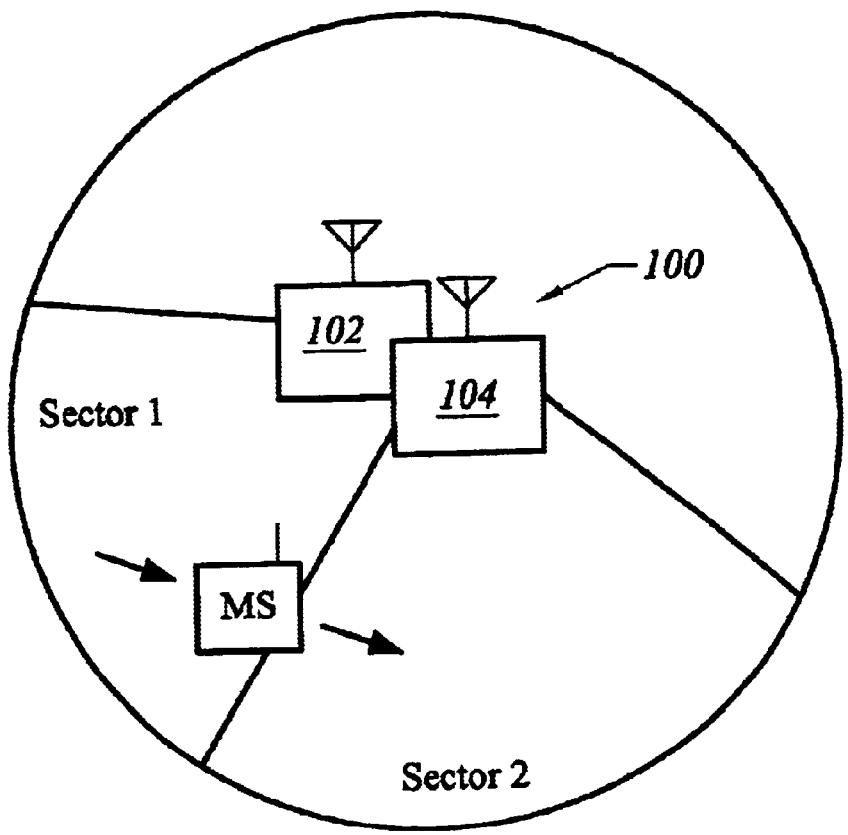
FIG. 1B illustrates softer handoff between two sector units of a single base station.

Although the system of FIG. 4 is shown and described for testing the soft handoff functionality between two base stations, as illustrated in FIG. 1A, the system can be used to test softer handoff between two sector units of a base station, as illustrated in FIG. 1B. For testing sector-to-sector handoff, the baseband processor 402 can be used alone to transmit the sector units' signals for handoff, or both baseband processors 402 and 404 can be controlled to act as the separate sector units of a single base station.

Although the present invention has been described above with particularity, this was merely to teach one of ordinary skill in the art how to make and use the invention. Many additional modifications will fall within the scope of the invention, as that scope is defined by the claims which follow.

What is claimed is:

1. A system for testing handoff of a mobile station (MS) from a first base station (BS1) to a second base station (BS2) comprising:
   a first baseband processor having an output providing digital signals representative of first base station analog signal levels provided from the first base station (BS1) to the mobile station (MS);
   a second baseband processor having an output providing digital signals representative of second base station analog signal levels provided from the second base station (BS2) to the mobile station (MS);
   an adder having a first input coupled to the output of the first baseband processor, and a second input coupled to the output of the second baseband processor, the adder adding digital signals provided at the first and second inputs to provide a digital sum signal at an output;
   a digital to analog (D/A) converter having an input coupled to the output of the adder to receive the digital sum signal, and an output providing a corresponding analog sum signal for coupling to the mobile station (MS);
   an analog to digital (A/D) converter having an input for coupling to the mobile station to receive an analog signal, and having an output for providing a digital signal corresponding to the analog signal received at the input of the A/D converter;
   a mobile station performance measurement unit having an input coupled to the output of the A/D converter for measuring a signal level indication signal transmitted from the mobile station (MS) indicative of the first base station analog signal levels and the second base station analog signal levels.

2. The system of claim 1 further comprising:
   a noise generator having an output providing a digital signal representative of an analog additive white Gaussian noise (AWGN) signal,
   wherein the adder has a third input coupled to the output of the noise generator, the adder adding the digital signals provided at the first, second and third inputs to the adder to provide a digital sum signal at the output of the adder.

3. The system of claim 1 further comprising:
   a controller having a first output providing a gain control signal representative of a first gain level for the first base station (BS1), and a second output providing a gain control signal representative of a second gain level for the second base station (BS2);

a first multiplier having a first input coupled to the output of the first baseband processor, a second input coupled to the first output of the controller, and an output coupled to the first input of the adder for multiplying the digital signal from the first baseband processor by the first gain level to increase a digital value for the first base station signal levels; and a second multiplier having a first input coupled to the output of the second baseband processor, a second input coupled to the second output of the controller, and an output coupled to the second input of the adder for multiplying the digital signal from the first baseband processor by the first gain level to increase a digital value for the second base station signal levels.

4. The system of claim 1 further comprising:

a quadrature modulator having an input coupled to the output of the D/A converter and an output for coupling to the mobile station; and a quadrature demodulator having an input for coupling to the mobile station and an output for coupling to the A/D converter.

5. The system of claim 1 further comprising:

an upconverter having an input coupled to the output of the D/A converter and an output for coupling to the mobile station; and a downconverter having an input for coupling to the mobile station and an output for coupling to the A/D converter.

6. The system of claim 1 further comprising:

a display;

a third baseband processor having an input coupled to the output of the A/D converter for decoding data received from the A/D converter and for providing information representative of the decoded data to the display.

7. A system for testing handoff of a mobile station (MS) from a first base station (BS1) to a second base station (BS2);

a first baseband processor having an output providing digital signals representative of first base station analog signal levels provided from the first base station (BS1) to the mobile station (MS);

a second baseband processor having an output providing digital signals representative of second base station analog signal levels provided from the second base station (BS2) to the mobile station (MS);

a noise generator having an output providing a digital signal representative of an analog additive white Gaussian noise (AWGN) signal;

a controller having a first output providing a gain control signal representative of a first gain level for the first base station (BS1), and a second output providing a gain control signal representative of a second gain level for the second base station (BS2), and a third output providing a gain control signal representative of a third gain level for the AWGN signal;

a first multiplier having a first input coupled to the output of the first baseband processor, a second input coupled to the first output of the controller, and an output for multiplying the digital signal from the first baseband processor by the first gain level to increase a digital value for the first base station signal levels;

a second multiplier having a first input coupled to the output of the second baseband processor, a second input coupled to the second output of the controller, and an output for multiplying the digital signal from the first baseband processor by the first gain level to increase a digital value for the second base station signal levels;

a third multiplier having a first input coupled to the output of the noise generator, a second input coupled to the third output of the controller, and an output for multiplying the digital signal from the noise generator by the first gain level to increase a digital value for the noise generator signal levels;

an adder having a first input coupled to the output of the first multiplier, a second input coupled to the output of the second multiplier, and a third input coupled to the output of the third multiplier, the adder adding digital signals provided at the first, second and third inputs of the adder to provide a digital sum signal at an output;

a digital to analog (D/A) converter having an input coupled to the output of the adder to receive the digital sum signal, and an output;

a quadrature modulator having an input coupled to the output of the D/A converter and an output; and an upconverter having an input coupled to the output of the quadrature modulator and having an output;

a duplexer having a first terminal coupled to the output of the upconverter, a second terminal for coupling to the mobile station and a third terminal;

a downconverter having an input coupled to the third terminal of the duplexer and having an output;

a quadrature demodulator having an input coupled to the output of the downconverter and having an output;

an analog to digital (A/D) converter having an input coupled to the output of the quadrature demodulator, and having an output;

a mobile station performance measurement unit having an input coupled to the output of the A/D converter for measuring a signal level indication signal transmitted from the mobile station (MS) indicative of the first base station analog signal levels and the second base station analog signal levels.

8. The system of claim 7 further comprising:

a display;

a third baseband processor having an input coupled to the output of the A/D converter for decoding data received from the A/D converter and for providing information representative of the decoded data to the display.

9. A system for testing handoff of a mobile station (MS) from a base station having a first antenna transmitting to a first sector and a second antenna transmitting to a second sector, the system comprising:

a first baseband processor having an output for providing digital signals representative of first analog signal levels from the first sector for providing to the mobile station (MS);

a second baseband processor having an output for providing digital signals representative of second analog signal levels from the second sector for providing to the mobile station (MS);

an adder having a first input coupled to the output of the first baseband processor, and a second input coupled to the output of the second baseband processor, the adder adding digital signals provided at the first and second inputs to provide a digital sum signal at an output;

a digital to analog (D/A) converter having an input coupled to the output of the adder to receive the digital sum signal, and an output providing a corresponding analog sum signal for coupling to the mobile station (MS);

an analog to digital (A/D) converter having an input for coupling to the mobile station to receive an analog signal, and having an output for providing a digital signal corresponding to the analog signal received at the input of the A/D converter;

a mobile station performance measurement unit having an input coupled to the output of the A/D converter for measuring a signal level indication signal transmitted from the mobile station (MS) indicative of the first analog signal levels and the second analog signal levels.

10. A method for testing handoff of a mobile station from a first base station to a second base station comprising:

(a) connecting a base station test system to a mobile station;

(b) transmitting configuration and access information from the base station test system to the mobile station;

(c) receiving a signal from the mobile station with the base station test system enabling a registration process to be performed, and converting the base station test system to a conversation state after the registration process is complete;

(d) generating a forward link digital signal to simulate a signal provided from the first base station and a second base station, (e) converting the forward link digital signal to an analog signal;

(f) transmitting the forward link analog signal from the base station test system to the mobile station;

(g) varying the forward link digital signal to simulate changing power levels from the first base station and the second base station; and (h) receiving a data signal from the mobile station in the base station test system representative of power levels received from the first base station and the second base station and providing an indication of the representative power levels to a display.

11. The method of claim 10, wherein in the step (f), the forward link digital signal further simulates an additive white Gaussian noise (AWGN) signal, and wherein in the step (g), the forward link digital signal is further varied to simulate changing power levels of the AWGN signal.

12. The method of claim 10 further comprising the step of:

(i) controlling the base station test system to send a message to the mobile station to cause soft handoff to be entered, and repeating step (h).

\* \* \* \* \*